United States Patent

Ganiaris

[15] 3,636,722
[45] Jan. 25, 1972

[54] CONCENTRATION OF COFFEE

[72] Inventor: Neophytos Ganiaris, Riverdale, N.Y.

[73] Assignee: Struthers Patent Corporation, Huntsville, Tex.

[22] Filed: Nov. 25, 1969

[21] Appl. No.: 879,843

Related U.S. Application Data

[62] Division of Ser. No. 651,451, July 6, 1967, abandoned.

[30] Foreign Application Priority Data

July 15, 1966 Great Britain........................31,832/66

[52] U.S. Cl. ..................................62/123, 99/199, 99/236 C
[51] Int. Cl. .............................................................A23f 1/06
[58] Field of Search ....................62/123, 340, 354, 58; 34/5; 99/236, 316, 199 C, 205 C

[56] References Cited

UNITED STATES PATENTS

| | | | |
|---|---|---|---|
| 3,339,372 | 9/1967 | Cottle | 62/123 X |
| 3,362,178 | 1/1968 | Cottle et al. | 99/199 X |
| 3,381,302 | 4/1968 | Reimus et al. | 99/199 X |
| 3,389,567 | 6/1968 | Bevarly et al. | 99/199 X |
| 3,455,700 | 7/1969 | McMichael et al. | 62/342 X |
| 1,847,149 | 3/1932 | Vogt et al. | 62/123 UX |
| 2,306,602 | 12/1942 | Harrington | 62/354 X |
| 2,886,587 | 5/1959 | Kolner | 99/199 X |
| 3,212,283 | 10/1965 | Jackson et al. | 62/123 X |
| 3,381,302 | 4/1968 | Reimus et al. | 99/199 X |

*Primary Examiner*—William E. Wayner
*Attorney*—William A. Drucker

[57] ABSTRACT

In a system for the freeze concentration of coffee, the ratio of the area of the heat transfer surfaces of the crystallizer to the volume of the crystallizer should be between 7:1 to 10:1. To accomplish this ratio, a crystallizer having both a jacket and a central passage for refrigerant may be used.

2 Claims, 3 Drawing Figures

CONCENTRATION OF COFFEE

This application is a division of my copending application Ser. No. 651,451, filed July 6, 1967, now abandoned.

BACKGROUND OF THE INVENTION

It has been found that coffee solids are precipitated out of a water solution when the solution is cooled to low temperatures between 20° and 32° F. and maintained at these temperatures for prolonged periods of time.

In the freeze concentration of coffee solutions containing from 20 to 45 percent solids, the solution must be cooled in the freeze concentration system to temperatures of 20° to 32° F. Thus, residence time of a coffee solution in a crystallizer and in associated ice crystal removing apparatus and piping should not be for a prolonged time. With a prolonged residence time, coffee solids will be precipitated out of solution in large quantities. The formation of precipitates in the freeze concentration of coffee should be minimized for three reasons.

1. The precipitate tends to be removed from the system with ice crystals leaving a final product of inferior flavor and aroma.
2. The precipitate affects the efficiency of the crystallizer since it is deposited on heat transfer surfaces.
3. The precipitate plugs up centrifuge screens and other ice crystal separating apparatus.

SUMMARY OF THE INVENTION

To avoid the problem of precipitation, a freeze concentration system for coffee extracts should be designed to have a residence time of less than 2.5 hours. Therefore, the entire volume of the freeze concentration system (pipelines, tanks, crystallizers, etc.) should be less than 2.5 times the hourly flow rate through the system. Pipelines and other elements can be designed on the basis of known technology and engineering principles to provide a minimum volume and a short residence time. However, in the case of crystallizers, other factors must be considered to determine the optimum residence time since the growth of ice crystals is a function of the time spent within the crystallizers.

The heat of crystallization must be removed through heat transfer surfaces of a crystallizer. These surfaces, of course, define the size of the crystallizer for a given temperature gradient and heat transfer coefficient. The design limits, heat transfer coefficients, degree of gradiation, and temperature differences are established on the basis of their effect on ice crystal growth.

The only known design parameter that affects both the ice crystal growth and the precipitate formation is the residence time within the crystallizer. Therefore, a relation of heat transfer area to volume for a crystallizer must be determined in order to insure a maximum crystal growth rate without precipitate formation.

This design parameter for a freeze concentration system for coffee extracts has been found to be a ratio between 7:1 to 10:1 for the area of the heat transfer surfaces to the volume of the freeze concentration crystallizer. To accomplish this design parameter, a crystallizer may have a jacket and a central passage for refrigerant to increase the heat transfer area for a given volume.

Thus it may be seen that this invention provides a more efficient freeze concentration system for coffee solutions.

DESCRIPTION OF THE PREFERRED EMBODIMENT

Figure 1:
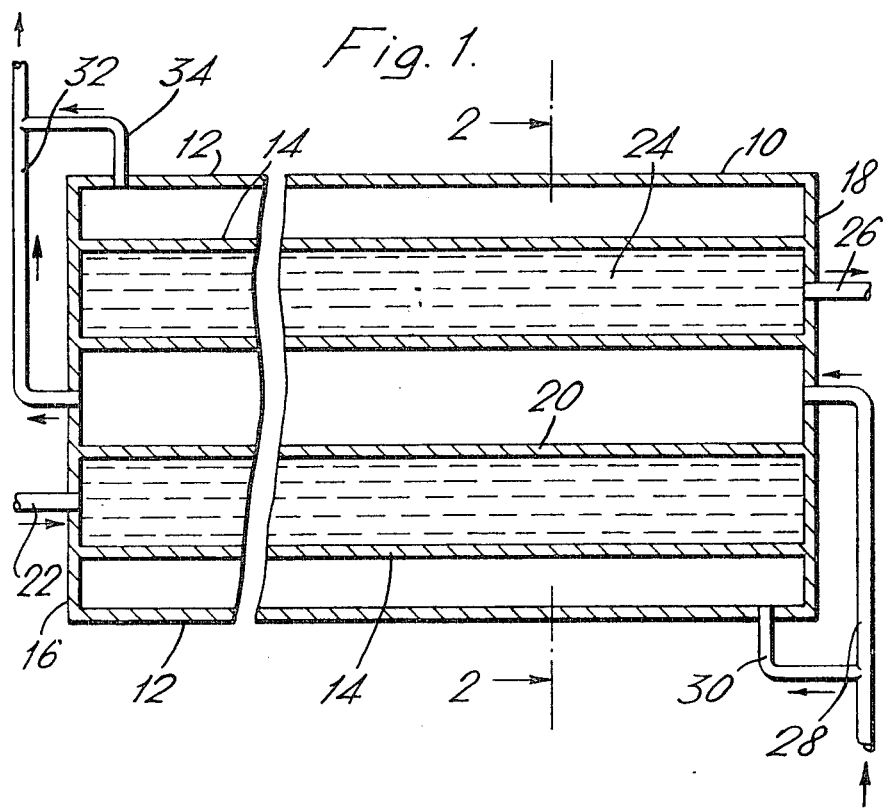
FIG. 1 is a longitudinal, vertical section through a crystallizer according to this invention with a central portion broken away.
Figure 2:
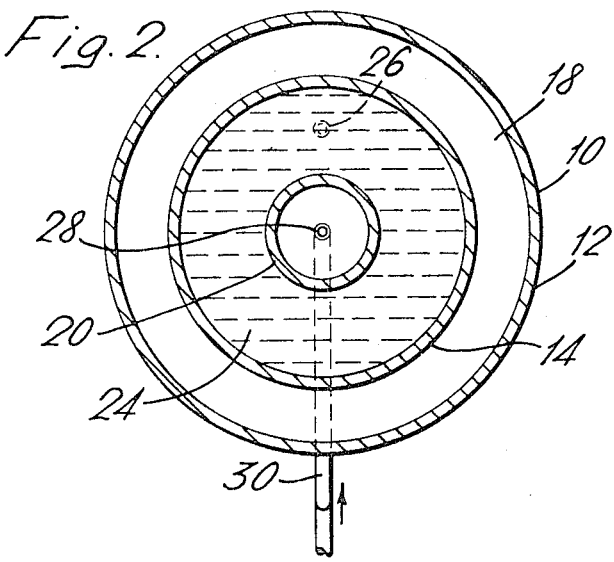
FIG. 2 is a transverse vertical section taken on line 2—2 of FIG. 1.
Figure 3:
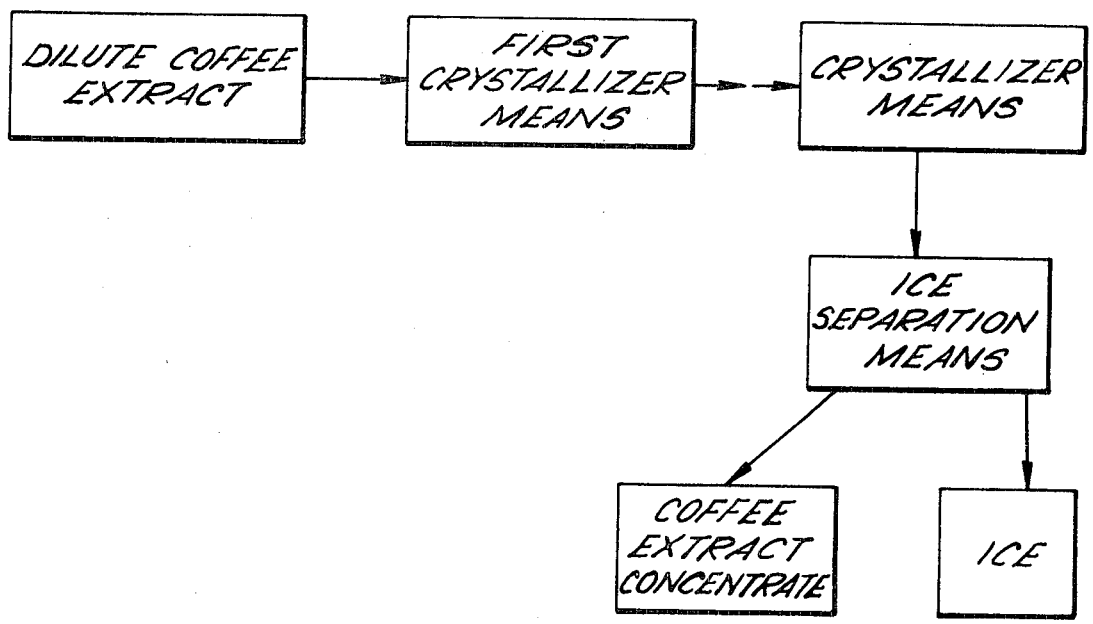
FIG. 3 is a flow chart showing plural crystallizers used in a coffee concentration system.

Referring to the drawing in detail, a crystallizer 10 has an outer shell 12 and an inner shell 14 extending between the end plates 16 and 18. A cylindrical inner refrigerant passage 20 extends within inner shell 14 between plates 16 and 18. Coffee solution 24 is introduced through pipe 22 and a slurry of coffee solution and ice crystals is withdrawn through pipe 26 from the annulus formed between passage 20 and inner shell 14. Refrigerant enters outer shell 12 and one end of passage 20 through the pipes 28 and 30 and refrigerant is withdrawn through the pipes 32 and 34.

While not shown, agitator blades or the like may be placed between passage 20 and shell 14 to prevent crystals from forming on these heat transfer surfaces. In addition, a series of crystallizers may be used in sequence if desired. This particular crystallizer construction enables the crystallizer volume for a given amount of ice crystal production to be reduced.

However, in the design of any crystallizer for the freeze concentration of coffee without precipitate formation, there should be a certain ratio, within limits, between the volume of the crystallizer and the heat transfer area. This may be expressed as the following design equation:

$$\frac{\text{Volume of the crystallizer in cubic feet}}{\text{Heat transfer area in square feet}} = \frac{1}{7} \text{ to } \frac{1}{10} \text{feet}$$

While this equation is valid for all systems for the freeze concentration of coffee without forming precipitates, the crystallizer shown will require a lower volume for a given crystal product and thus reduce the total cost of the apparatus.

While this invention has been shown and described in the best form known, it will nevertheless be understood that this is purely exemplary and that modifications may be made without departing from the spirit and scope of the invention except as it may be more limited in the appended claims.

What is claimed is:

1. An apparatus system for concentration of aqueous liquid coffee solution containing from 20 to 45 percent dissolved coffee solids, comprising:
   a. plural serially connected crystallizer means, each having an outer shell, and an inner shell having a cylindrical heat transfer surface, forming ice therein at coffee temperatures down to 20° F.,
   b. inlet and outlet means coupled to said crystallizer means to allow refrigerant to pass across the outside of the heat transfer surface of the inner shell, and coffee solution to pass across the inside of the heat transfer surface of the inner shell through a crystallization zone having an annular cross section,
   c. the ratio of the total annular volume of said crystallizer means inner shell to the area of said inner shell heat transfer surface being sufficient to avoid precipitate formation from coffee, said annular volume being provided by a hollow axial central cylindrical member within said inner shell,
   d. means to provide a flow rate of said coffee solution through the annular crystallization zone of each said crystallizer means of greater than 40 percent per hour of the volume of each said crystallizer means, and
   e. means separating ice from said coffee extract after passage through at least two serially connected crystallizer means.

2. An apparatus system according to claim 1 including coffee agitation means within said annular crystallization zone.

* * * * *